United States Patent [19]

Lee et al.

[11] Patent Number: 5,390,882
[45] Date of Patent: Feb. 21, 1995

[54] STACKABLE CLIP WITH A FLAT PROFILE ON A WELD STUD, WITH METHOD

[75] Inventors: Daniel A. Lee, Troy; Jose L. Farah, Oak Park; Michael M. Filicky, Warren; Mava M. Vandervennet, Westland, all of Mich.

[73] Assignee: Chrysler Corporation, Highland Park, Mich.

[21] Appl. No.: 125,394

[22] Filed: Sep. 23, 1993

[51] Int. Cl.⁶ .................................... F16L 3/22
[52] U.S. Cl. .................... 248/68.1; 24/16 R; 248/74.3
[58] Field of Search .......... 248/74.3, 68.1, 65, 248/73, 74.1, 74.2, 74.5; 24/16 R

[56] References Cited

U.S. PATENT DOCUMENTS

| | | | |
|---|---|---|---|
| 3,334,851 | 8/1967 | Cassidy et al. | 248/68.1 |
| 3,556,447 | 1/1971 | Jenkins et al. | 248/68.1 X |
| 3,576,305 | 4/1971 | Welsh et al. | 248/68.1 |
| 4,728,064 | 3/1988 | Caveney | 248/74.3 |
| 4,842,237 | 6/1989 | Wollar | 248/73 X |
| 4,865,281 | 9/1989 | Wollar | 248/73 X |
| 4,871,134 | 10/1989 | Oikawa | 248/65 |
| 5,042,114 | 8/1991 | Parrish | 248/743 X |
| 5,221,065 | 6/1993 | Siems et al. | 248/65 |
| 5,251,857 | 10/1993 | Grice et al. | 248/74.2 X |

*Primary Examiner*—Ramon O. Ramirez
*Attorney, Agent, or Firm*—Wendell K. Fredericks

[57] ABSTRACT

A vehicle has a plurality of studs secured to its frame at predetermined locations. At least one groups of wires used to electrically interconnect electrical components of the vehicle are taped together and routed along the vehicle frame. Clips, each having a beam including a beam opening with a gripping device in the opening, are forced down onto the studs to secure the clips onto the studs. At least one wire of the group of wires is secured to the clip and therefore to the stud. The other wires of the group of wires, which are taped to the at least one wire, are according secured to the stud. A method of securing groups of wires to the vehicle frame incorporates use of the clips.

14 Claims, 1 Drawing Sheet

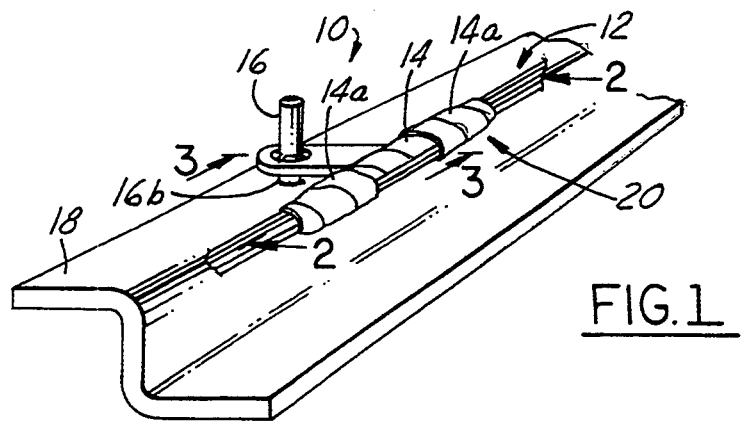
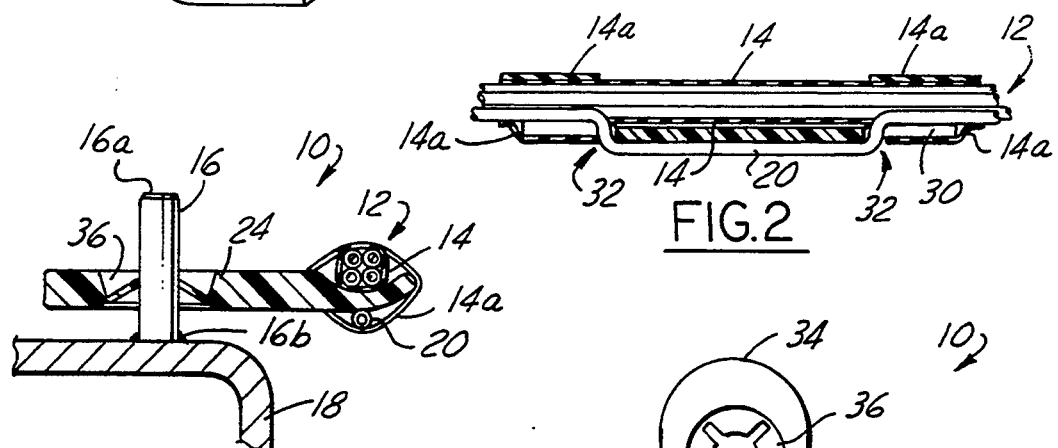
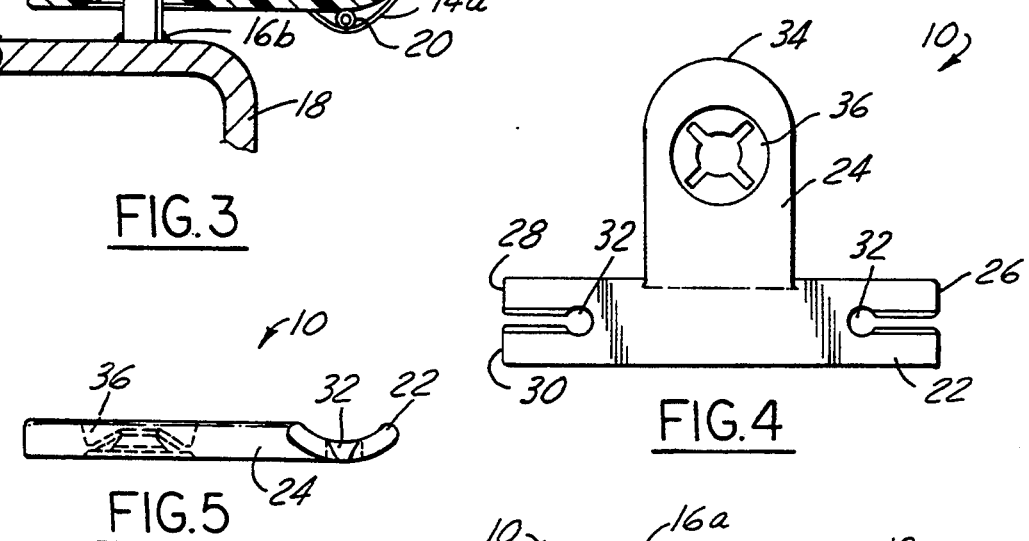
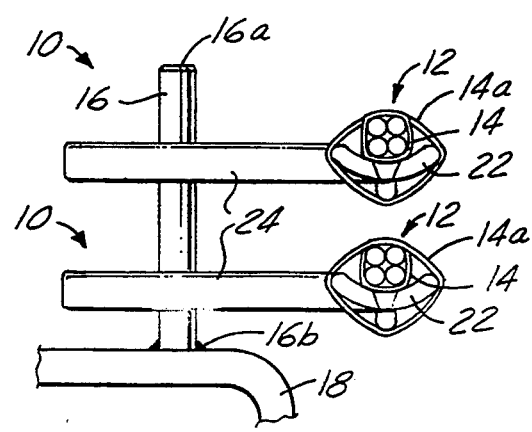

STACKABLE CLIP WITH A FLAT PROFILE ON A WELD STUD, WITH METHOD

FIELD OF THE INVENTION

This invention relates generally to wiring for vehicles, and more particularly to means of restraining groups of wires in a wiring system as the wires are channeled from one part of the vehicle to another, between such electrical components of the vehicle as lights, audio systems, batteries, sensors, gauges, and computerized subassemblies. More particularly, this invention relates to wiring clips for stacking groups of wires as the wires are routed along the substructure of a vehicle, electrically interconnecting components of an vehicle's electrical system.

BACKGROUND OF THE INVENTION

In a modern vehicle, many leads or wires are used to electrically interconnect electrical components including lights, electronic gauges, radio, message center, power antennae relays, intermittent windshield wiper controls, electronic air conditioning switches, and relays, among other components interconnected by leads and wiring to electrical sources and/or sensors.

Because of the sheer number of wires used to electronically interconnect components in a vehicle, wiring harnesses—taped or otherwise constrained groups of wires—are typically used to arrange the wires in groups. The groups of wires are attached the vehicle and routed along its substructure in an ordered arrangement of what would otherwise be a spaghetti-like entanglement of wires. The ordered arrangement facilitates tracing the wires for proper connections during assembly and for trouble shooting connections during repair. Often an ordered arrangement includes grouping wires in subarrangements, for example, leads from a radio to speakers may be grouped together. These subarrangements pass along common routes with other subarrangements or wire groups. Several such wire groups may be attached to the vehicle at common sites.

Manually attaching and routing wire groups is a tedious and labor intensive task. Furthermore, owing in part to the tediousness and labor intensiveness of the task, manual manipulation of groups of wires during assembly of the vehicle and its wiring system often results in damaging wires. Because of the number of wires and wire groups, quick, efficient, and easy attachment of wire groups to the vehicle structure is preferred.

OBJECTS OF THE INVENTION

Accordingly, it is an object of the present invention to provide an improved means of attaching, to the vehicle, groups of wires that make up a vehicle's wiring system.

It is another object of this invention to provide an improved clip for attaching groups of wires to the substructure of a vehicle.

It is a further object of this invention to provide an improved clip for carrying and securing groups of wires in stacked relation with other groups of wires.

Yet still a further object of the present invention is to provide an improved clip that allows for quick attachment and detachment, to and from the structure of a vehicle, groups of wires in stacked relationship, one group to another.

SUMMARY OF THE INVENTION

A clip, in accordance with the present invention, carries a group of wires held together by tape to effect a wiring harness. The clip is secured to the weld stud of a vehicle frame so that the clip is cantilevered from the weld stud. A single restrained wire of the group of wires is in special relationship with the clip to secure the wire, and the group of wires taped to it, to the clip. In addition, the group of wires, including the wire in special relationship, may be taped to the clip.

The clip is constructed as an integral unit, including a cradle that is attached to a beam. In its preferred orientation when secured to a weld stud, the cradle is upwardly concaved so that a group of wires can supported within the concavity of the cradle.

The cradle extends longitudinally between a first end and a second end of the cradle. In each of the first and second ends and is a slot. The slot is generally V-shaped and leads to a wire securing opening through cradle. A single wire may be routed into the slot at one end of the cradle and pinched through and into wire securing opening to which the slot communicates. The single wire is then routed underneath the cradle to the slot at the other end of the cradle and pinched through and into the wire securing opening to which the latter slot communicates.

The beam of the clip is preferably formed into the cradle as the clip is injection molded of a plastic resin. Opposite the part of the beam that is attached to the cradle is a rounded end of the beam. Proximate the rounded end is a beam opening, which has radial grips extending radially inwardly into beam opening. These radial grips are bendable to accommodate the radius of weld stud when beam is forced down over weld stud as weld stud extends through beam opening.

By this structure, the clip may be forced down over the weld stud, with the grips bending to accommodate the girth of the weld stud, the clip thus oriented so that the beam is cantilevered from the clip with the cradle holding a group of wires, one wire being secured in the clip by being routed through wire securing openings. Other clips may be forced onto the same weld stud and hold other groups of wires in stacked relationship to the first clip supported by the weld stud and to one another.

BRIEF DESCRIPTION OF THE DRAWINGS

FIG. 1 is a perspective front view of a clip in accordance with the invention as secured on the weld stud of a vehicle frame.

FIG. 2 is a cross-section of the clip of FIG. 1, taken in the direction of arrows 2—2 of FIG. 1.

FIG. 3 is a cross-section of the clip as shown in FIG. 1, taken in the direction of arrows 3—3 of FIG. 1.

FIG. 4 is a plan view of the clip shown in FIG. 1.

FIG. 5 is a side view of a single clip in accordance with the invention.

FIG. 6 is a cross-section, taken generally in the same viewing plane as in FIG. 2, but showing several clips on a weld stud, each clip supporting a group of wires in accordance with the invention.

DETAILED DESCRIPTION OF THE PREFERRED EMBODIMENT

Reference is now made to the drawings and, in particular, to FIG. 1, in which a clip 10 in accordance with the present invention carries a group of wires 12. The group of wires 12 is held together by tape 14, which is not to be confused with tape 14a used to tape the group of wires 12 to clip 10 in a manner to be later explained. Accordingly, tape 14 is used to effect a wiring harness for the group of wires 12. Clip 10 is secured, as further disclosed below, to the weld stud 16 of a vehicle frame 18. A single restrained wire 20 of the group of wires is referenced in the drawing as being beneath the group of wires 12 at clip 10. This single wire 20 is in special relationship with clip 10, as will be later explained.

Each weld stud 16 is welded at its base 16b to the vehicle frame 18 at a predetermined site. A plurality of weld studs 16 are so located at a plurality of predetermined sites. Each weld stud 16 is threaded from its base to its free end 16a. Preferably, a standard sheet metal screw may be used as a weld stud in accordance with the invention.

Referring now to FIGS. 2-5, together, clip 10 is made of plastic and is constructed to include a support member 22 for supporting a group of wires 12. In the preferred embodiment, the support member 22 is an elongate cradle 22. The support member or cradle 22 is attached to a beam 24. In its preferred orientation when secured to a weld stud 16, as shown in FIG. 3, the cradle 22 is concaved away from the frame 18 so that the group of wires 12 can be supported within the concavity of the cradle 22. For purposes of orientation, the cradle 22 may be said to have two sides, the concave side being designated as the upper side and the opposing side being designated the underside.

The cradle 22 extends longitudinally between a first end 26 and a second end 28. In each of the first and second ends 26 and 28 is a slot 30. Each slot 30 has a V-shaped cross-section and communicates with a round, wire securing opening 32 through the cradle 22. In accordance with FIGS. 2 and 3, a single wire 20 of the group of wires 12 may by routed into slot 30 and into wire securing opening 32 at one end, for example, first end 26. The single wire 20 is then routed underneath cradle 22 to slot 30 and into wire securing opening 32 at the other end of cradle 22, for example, second end 28. Additional security may be obtained from having tape 14a wrapped around both the group of wires 12 and the cradle 22 of clip 10.

Referring now in particular to FIGS. 4 and 5, beam 24 is attached, preferably formed integrally with cradle 22. Beam 24 extends from cradle 22 to a rounded beam end 34. Proximate beam end 34 is a beam opening 36. Extending radially inwardly into beam opening 36 is a radial gripping device 38. Radial gripping device 38 is flexible and bendable to accommodate the radius of weld stud 16 when beam 24 is forced down over weld stud 16 as weld stud 16 extends through beam opening 36, as may be seen with reference to FIG. 3.

As can be seen now with reference to FIG. 6, clip 10 is stackable with other clips 10, so that several groups of wires 12 may be routed along a vehicle frame 18 where the several groups of wires 12 may be secured coincidentally on one weld stud 16.

The method of using clips 10 in attaching wires to the frame 18 of a vehicle is as follows: Studs 16 are secured to the vehicle's frame 18 at predetermined locations. The groups of wires 12 are routed along the vehicle's frame 16. The clips 10 are forced down on the studs 16 at predetermined locations. In each instance, a single wire 20 is routed into the slot 30 at one end of the cradle 22 and then into the wire securing opening 32 at the same end, the single wire 20 is routed along the underside of the cradle 22 and into the slot 30 and then into the wire securing opening 32 at the other end. Alternatively, single wires 20 are secured to clips 10 at predetermined locations along each group of wires 12. The clips 10 are then forced down on the studs 16 at predetermined locations. The clips 10 are taped to the group of wires 12 carried by the respective clips 10.

Although preferred embodiments of the present invention have been disclosed, one of ordinary skill in the art would recognize that certain modifications would come within the scope of this invention, for that reason, the following claims should be studied in order to determine the scope and content of the present invention.

We claim:

1. The combination of at least one group of wires taped together, at least one stud, and at least one clip for securing the group of wires with respect to said stud, the combination comprising:
    a stud secured to a vehicle frame;
    at least one wire; and
    at least one clip having a beam including a beam opening, said opening having means to grip said stud to secure said clip thereon, said at least one wire being secured to said clip, whereby said at least one wire is secured to said stud when said clip is secured on said stud,
    wherein said at least one clip includes a clip having a support member for supporting a group of wires,
    wherein said at least one wire is a group of wires restrained together in a wiring harness and said group of wires is supported by said support member,
    wherein said support member has an upper side and an underside and extends longitudinally between a first end and a second end, each of said first and second ends having a slot that communicates with a round wire securing opening through the support member, and wherein said group of wires is secured to said clip by at least one wire being routed into the slot and then the wire securing opening at said first end and routed along the underside of said support member and into the slot and then the wire securing opening at said second end.

2. The combination of claim 1, wherein said at least one wire is a group of wires restrained together in a wiring harness.

3. The combination of claim 1, wherein said clip is made of plastic.

4. The combination of claim 1, wherein said support member is an elongate cradle attached to said beam, said cradle having a concavity and said group of wires being supported within the concavity of the cradle.

5. The combination of claim 4, wherein said means to grip said stud to secure said clip thereon is a radial gripping device that is flexible and bendable to accommodate the radius of said stud when said beam is forced down over said stud as said stud extends through said beam opening.

6. The combination of claim 5, wherein said stud is a weld stud secured to said vehicle frame by being welded thereto.

7. The combination of claim 6, wherein said at least one clip is a plurality of clips stacked one adjacent another on said stud.

8. A method of attaching wires to the frame of a vehicle the method comprising the steps of:
    a first step of securing studs to the said vehicle frame at predetermined locations;

a second step of routing a group of wires along the vehicle frame to a predetermined location of one said stud;

a third step of forcing a clip down on said stud, said clip having a beam including a beam opening and a support member for supporting a group of wires, the support member having an upper side and an underside and extending longitudinally between a first end and a second end, each of said first and second ends having a slot that communicates with a round wire securing opening through the support member; and a forth step routing a single wire of said group of wires into the slot at the first end of the support member and then into the wire securing opening at said first end, continuing said routing of said single wire along the underside of the support member and into the slot and then into the wire securing opening at the second end of said support member.

9. The method of claim 8, further comprising a fifth step of routing the group of wires along the vehicle frame to the predetermined location of another said stud; and repeating said third and forth steps at said another location.

10. The method of claim 9, further comprising the first through fifth steps at the same predetermined locations with at least two clips being stacked adjacent one another on one stud, each clip in said stacked relationship carrying a different group of wires.

11. A clip for carrying and securing wire groupings, the clip comprising:
  a beam including a beam opening, said opening having means to grip a stud secured to a vehicle frame; and
  a support member integrally attached to said beam, said support member for supporting a group of wires,
  wherein said support member has an upper side and an underside and extends longitudinally between a first end and a second end, each of said first and second ends having a slot that communicates with a round wire securing opening through the support member whereby a group of wires may be secured to said clip by at least one wire being routed into the slot and then the wire securing opening at said first end and routed along the underside of said support member and into the slot and then the wire securing opening at said second end.

12. The clip of claim 11, wherein said support member is an elongate cradle attached to said beam.

13. The clip of claim 12, wherein said support member is an elongate cradle attached to said beam, said cradle having a concavity and said group of wires being supported within the concavity of the cradle.

14. The clip of claim 13, wherein said means to grip said stud to secure said clip thereon is a radial gripping device that is flexible and bendable to accommodate the radius of said weld stud when said beam is forced down over said stud as said weld extends through said beam opening.

* * * * *